Feb. 22, 1955 G. JOHNSTON 2,702,386
FIRE AND WATER SAFETY SUIT
Filed March 22, 1949 6 Sheets-Sheet 2
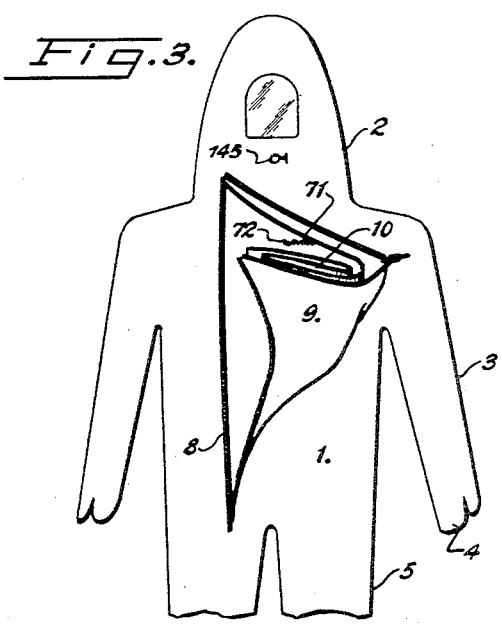
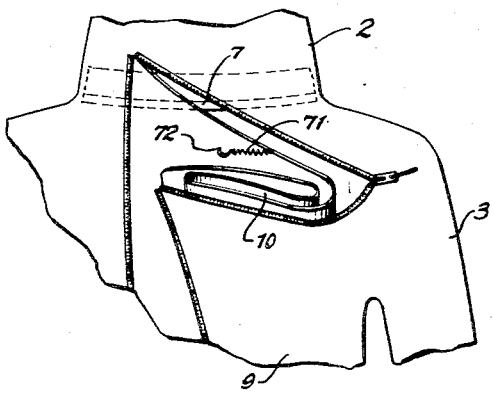
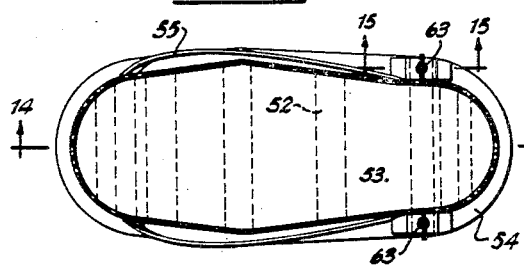
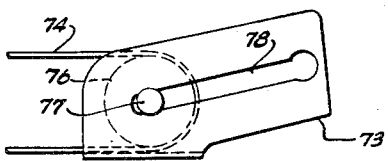
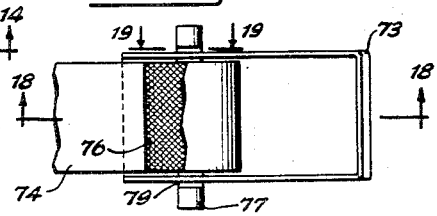
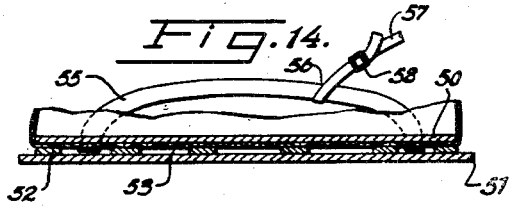
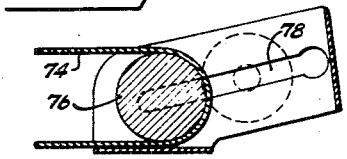
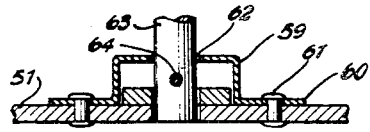
Inventor
GREENHOW JOHNSTON.
By Shoemaker & Mattern
ATTORNEYS Feb. 22, 1955 G. JOHNSTON 2,702,386
FIRE AND WATER SAFETY SUIT
Filed March 22, 1949 6 Sheets-Sheet 3
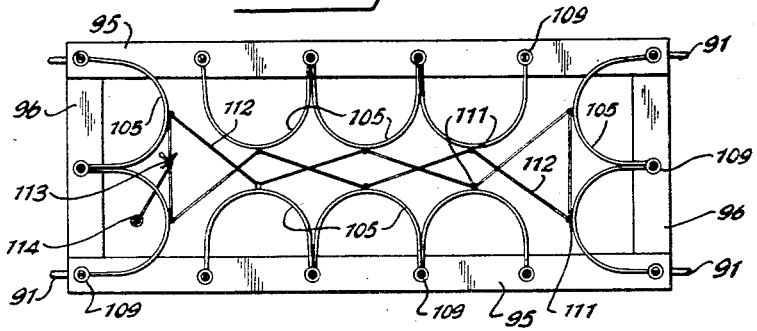
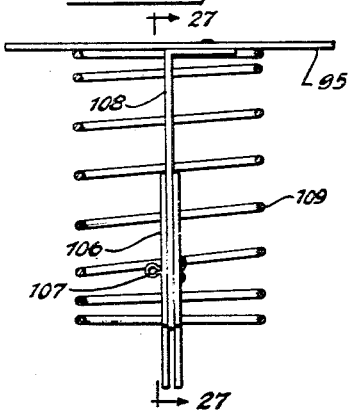
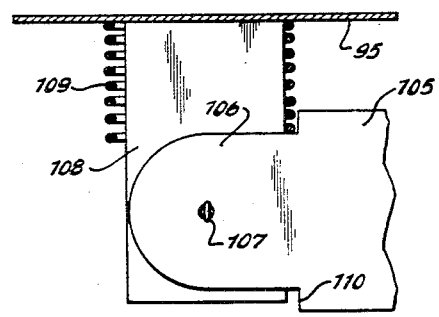
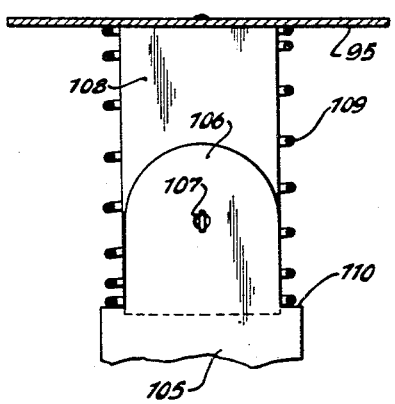
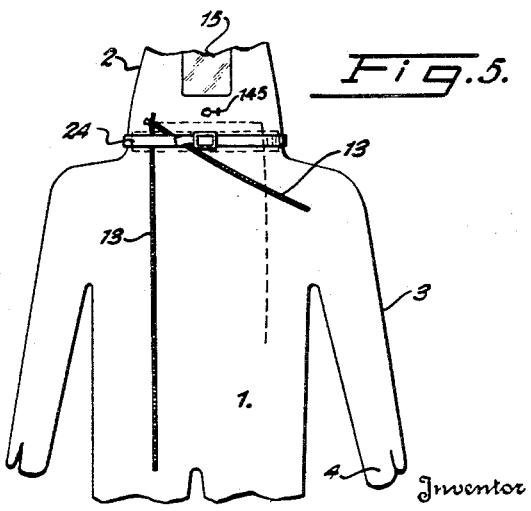
Inventor
GREENHOW JOHNSTON.
By Shoemaker & Mattau
ATTORNEYS

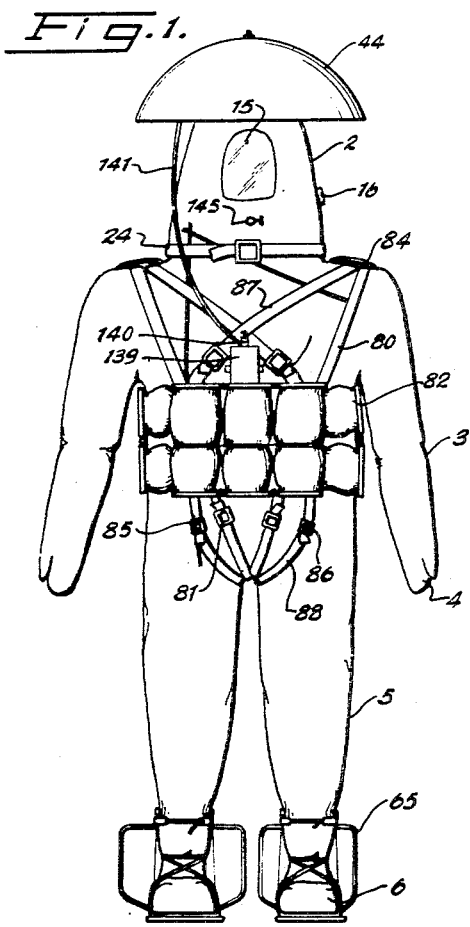

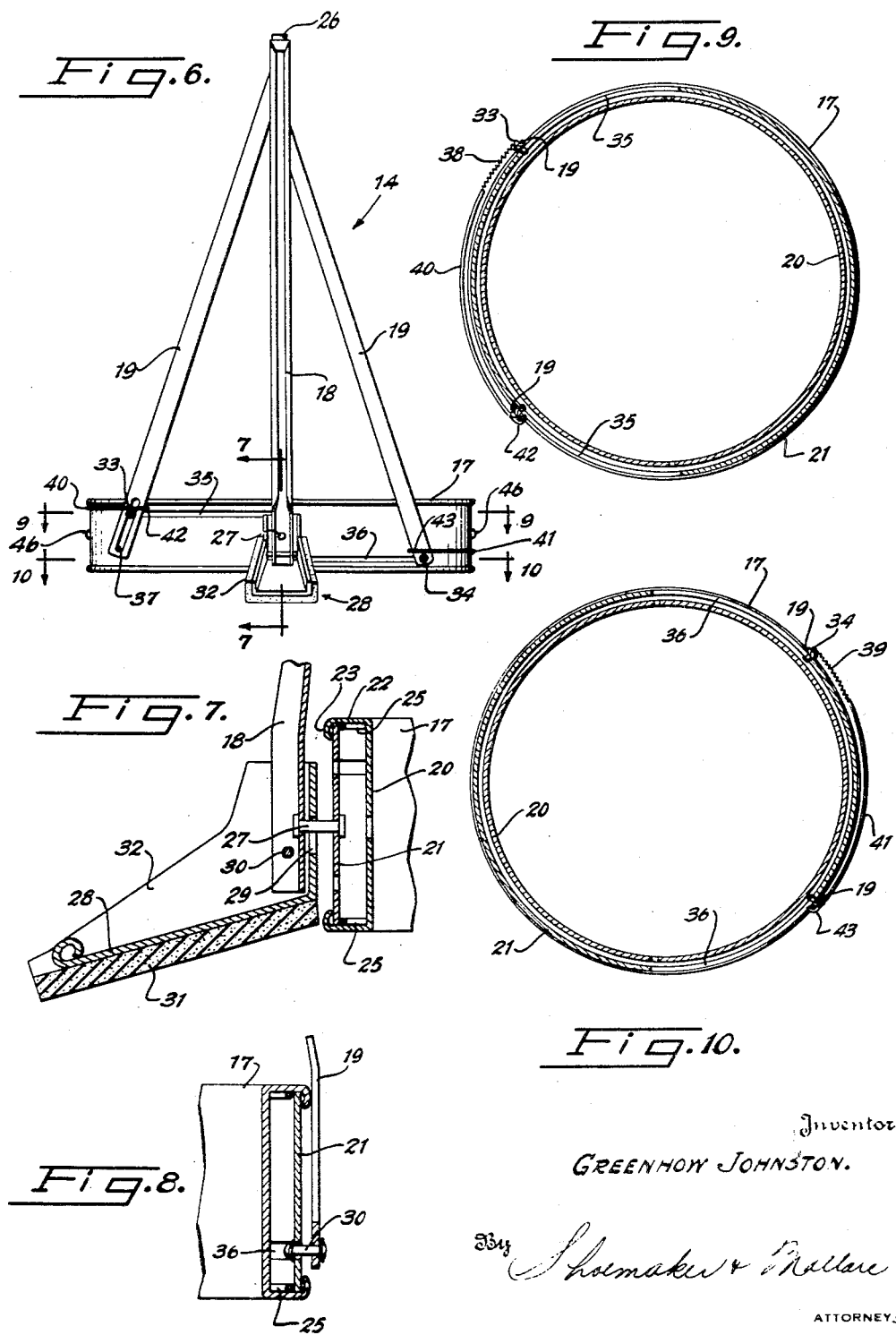

Feb. 22, 1955 G. JOHNSTON 2,702,386
FIRE AND WATER SAFETY SUIT
Filed March 22, 1949 6 Sheets-Sheet 5
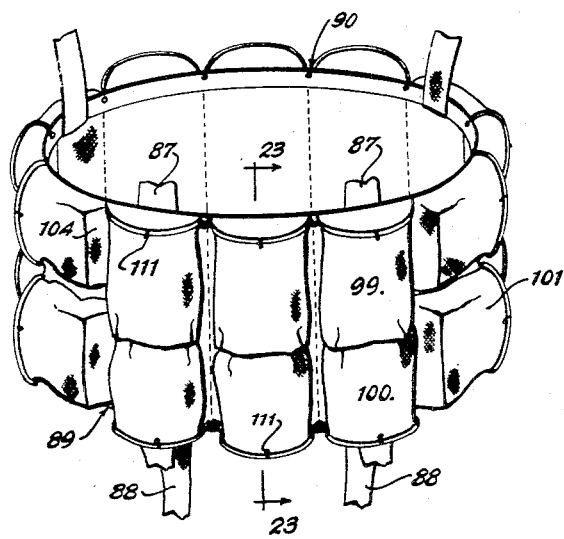
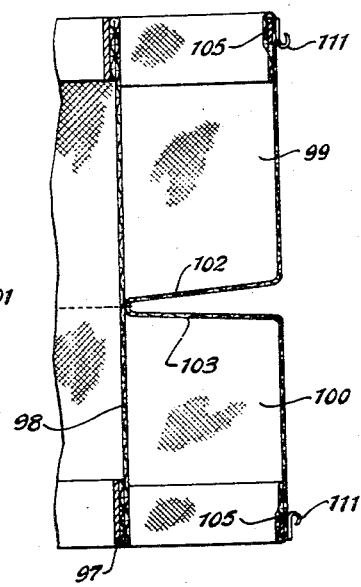
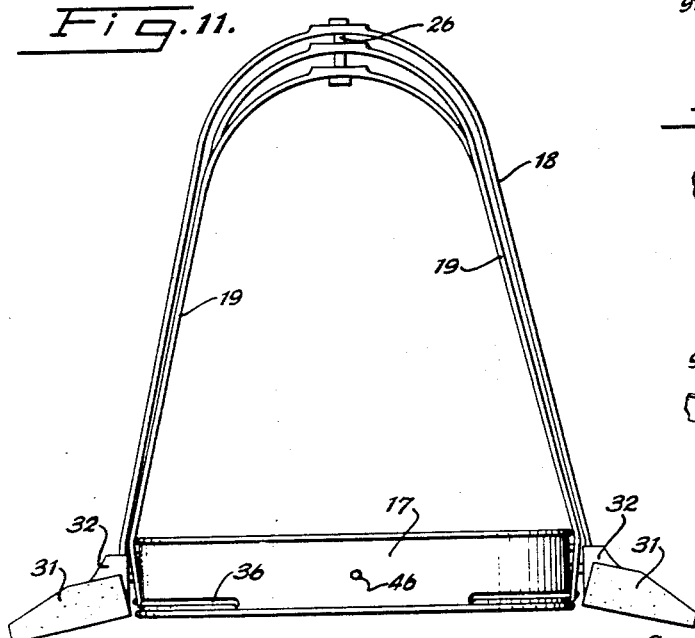
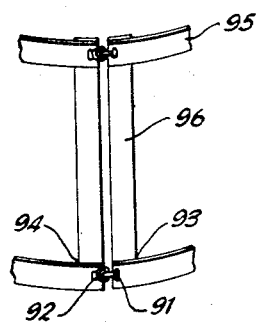
Inventor
GREENHOW JOHNSTON.
By Shoemaker & Mattare
ATTORNEYS Feb. 22, 1955      G. JOHNSTON      2,702,386
FIRE AND WATER SAFETY SUIT
Filed March 22, 1949      6 Sheets-Sheet 6
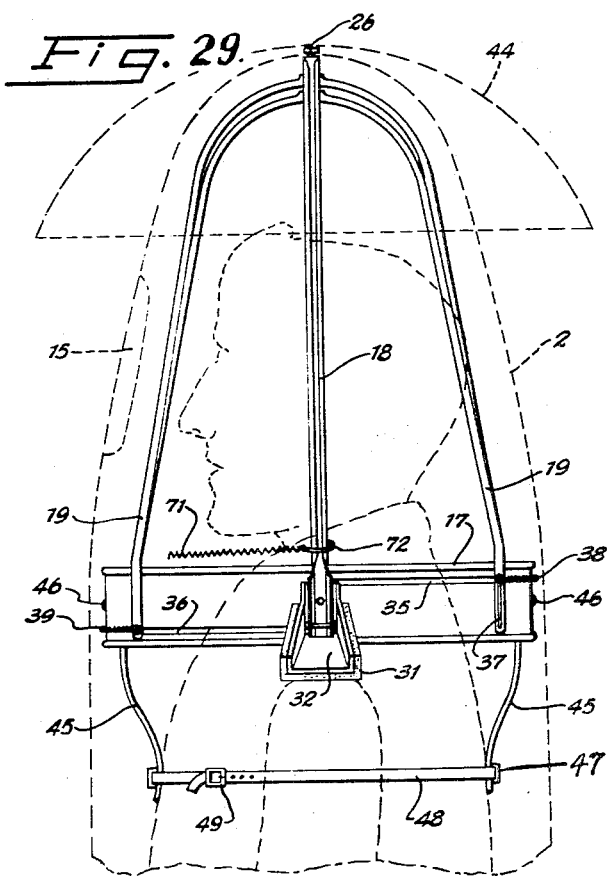
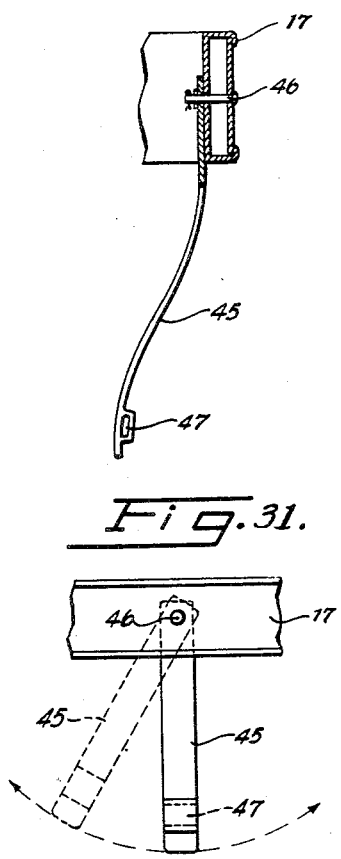
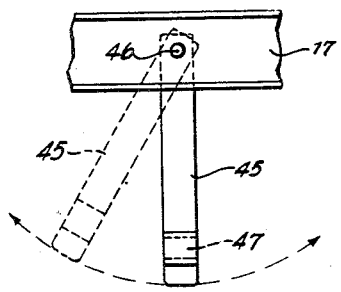
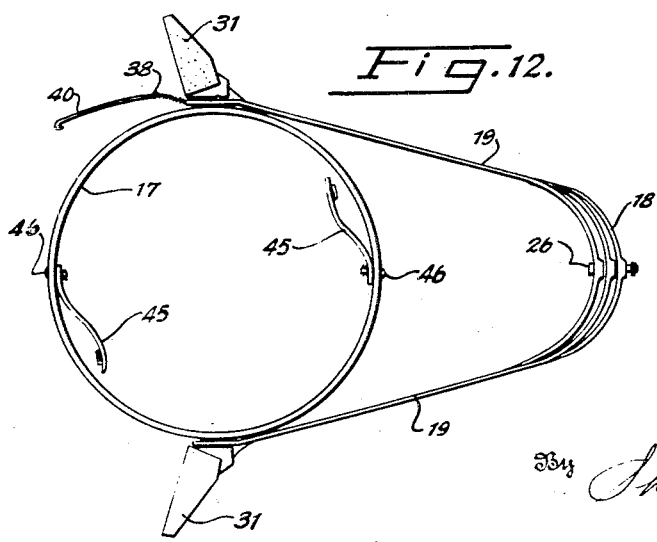
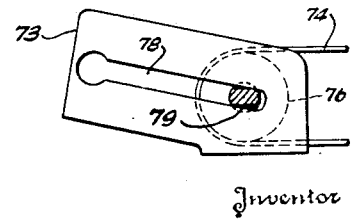
Inventor
GREENHOW JOHNSTON.
By Shoemaker & Mattau
ATTORNEYS

United States Patent Office 2,702,386
Patented Feb. 22, 1955

2,702,386

FIRE AND WATER SAFETY SUIT

Greenhow Johnston, Richmond, Va., assignor to Temple Safety On Sea Mfg. Co. Inc., Richmond, Va., a corporation of Virginia Application March 22, 1949, Serial No. 82,795

10 Claims. (Cl. 2—81)

The invention relates to a fire and water safety suit for saving lives in shipwrecks, airplane crashes, fighting fire and like disasters.

An object of the present invention is to provide a simple, practical and efficient fire and water safety suit constructed of a single piece of fire and water resistant material such as fiber glass construction or other suitable material, comprising a body having arm portions, legs having foot portions, and an integral hood, said body being cut across the top portion thereof and longitudinally at one side and having a breast portion with a fullness adapted, when unfastened, to afford an opening of sufficient size to enable the wearer to readily step into the suit with his ordinary clothing.

A further object of the invention is to provide a fire and water safety suit of this character which, when the fullness of the breast portion is folded to form a sealing flap of a plurality of plies or layers and the front of the body is closed by zippers or other suitable fastening means, will be air and water tight.

Another object of the invention is to provide a substantially dome-shaped hood extending upwardly from the shoulder portions of the body and provided at the front with a transparent window and supported in a distended position to receive comfortably the head and shoulders of the wearer by a collapsible bird-cage frame comprising a rigid collar and main auxiliary approximately inverted U-shaped frame members, the main frame member being pivotally connected to the collar at diametrically opposite points and the auxiliary frame members being pivotally connected at the top with the main frame and slidably and pivotally connected to the collar at the lower ends of their sides to enable them to be arranged contiguous to the main frame section and also to be arranged in spaced relation with the same to provide a plurality of peripherally spaced supporting means for maintaining the hood in said distended position.

Another object of the invention is to enable the main and auxiliary frame members to be swung downwardly and collapsed against the collar when the auxiliary frame members are rotated on the top pivot and are arranged contiguous to the main frame member at opposite sides thereof.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a front elevation of a fire and water safety suit constructed in accordance with the present invention;

Fig. 2 is a rear elevation of the same;

Fig. 3 is a front elevation of the upper portion of the suit illustrating the arrangement of the cuts to form the front opening and the folding of the fullness of the breast portion to form a sealing flap;

Fig. 4 is an enlarged detail view illustrating more clearly the arrangement of the folds to form the sealing flap;

Fig. 5 is a front elevation showing in dotted lines the sealing flap extending above the collar of the hood when the suit is closed;

Fig. 6 is an enlarged elevation of the hood-supporting frame;

Fig. 7 is an enlarged detail view on the line 7—7 of Fig. 6;

Fig. 8 is a detail sectional view illustrating the manner of securing the auxiliary frame members to the collar;

Fig. 9 is a horizontal sectional view taken substantially on the line 9—9 of Fig. 6, the main frame member being omitted;

Fig. 10 is a horizontal sectional view taken on the line 10—10 of Fig. 6;

Fig. 11 is an enlarged detail view of the hood supporting frame showing the main and auxiliary frame members arranged contiguous to one another preparatory to collapsing the frame completely;

Fig. 12 is an enlarged plan view showing the hood supporting frame completely collapsed;

Fig. 13 is an enlarged plan view of one of the foot portions, the fabric being in section;

Fig. 14 is a section on the line 14—14 of Fig. 13;

Fig. 15 is a secetion on the line 15—15 of Fig. 13;

Fig. 16 is a detail side view of the catch for securing the tops of the blades or wings to the legs;

Fig. 17 is a plan view of the same, the knurled roller being partially broken away;

Fig. 18 is a section on the line 18—18 of Fig. 17;

Fig. 19 is a section on the line 19—19 of Fig. 17;

Fig. 20 is an elevation of the wings or blades of one of the foot portions;

Fig. 21 is a plan view of the same;

Fig. 22 is an enlarged detail perspective view of the collapsible buoyancy belt;

Fig. 23 is a section on the line 23—23 of Fig. 22;

Fig. 24 is a detail perspective view showing the means for detachably connecting the frames of the sections of the buoyancy belt;

Fig. 25 is a plan view of one section of the frame of the buoyancy belt illustrating the means for holding the pockets collapsed;

Fig. 26 is an enlarged detail sectional view showing one of the springs in its extended position;

Fig. 27 is a section on the line 27—27 of Fig. 26;

Fig. 28 is a sectional view similar to Fig. 27 showing the spring compressed;

Fig. 29 is an elevation of the hood-supporting frame and the front and rear folding braces and the breast strap and illustrating the manner of mounting the same on the wearer of the suit;

Fig. 30 is an enlarged detail sectional view of the rear brace;

Fig. 31 is an enlarged detail view illustrating the manner of folding the pivoted braces of the collar.

In the accompanying drawings, in which is illustrated one embodiment of the invention, the fire and water safety suit comprises in its construction a body 1, a hood 2 surmounting the body, arms 3 terminating in mittens 4, and legs 5 having foot portions 6, made of a single piece of fire and water resistant fabric of fiber glass or other suitable material. The hood 2 is approximately dome-shaped and the body 1 is cut or slit transversely and longitudinally, the transverse slit 7 extending at a slight inclination from a point above the lower end of the hood and the adjacent shoulder across the front of the body to a point below the opposite shoulder, and the longitudinal slit 8 extending downwardly from the upper end of the transverse slit to approximately the waist of the body 1. The fabric at the juncture of the hood and the body provides a collar portion which surrounds the neck of the wearer. The front of the suit is provided with a relatively wide panel 10 attached on one side to the body behind the longitudinal slit 8 and extending across the front with the other side attached to the closure flap 9 providing a fullness which when opened forms a large opening sufficient to enable the wearer to readily step into the suit, the panel 10 being foldable along longitudinal lines behind the flap 9 and interiorly of the body, when the flap 9 is attached to the body by transverse and longitudinal zippers 12 and 13.

The hood, which is supported in a distended condition by a collapsible supporting frame 14, is provided at the front with a window 15 consisting of a framed plate or pane of non-breakable glass or other transparent material, and it has preferably at one side an air exhaust or exhalation valve 16 which may be of any desired construction and which permits air to be exhausted from the interior of the suit and at the same time prevents entrance of air and water into the suit from the exterior. Other exhalation means may be provided and the exhaust valve may be omitted when it is desired to trap air within the suit to assist in the buoyancy thereof.

The collapsible hood-supporting frame comprises in its construction a rigid collar 17, a main frame member 18, and auxiliary frame members 19. The rigid collar 17 which is relatively broad is composed of inner and outer concentric bands 20 and 21, the inner band being provided at its upper and lower edges with outwardly extending annular flanges 22 receiving the outer band 21 and having partially rolled edges forming beads 23 which confine the outer band within the parallel annular flanges 22 and which also are adapted to form stops or ribs for retaining an exterior collar strap 24 in engagement with the collar when the suit is closed, as illustrated in Figs. 1 and 5 of the drawings. The strap 24 confines the sealing flap against the exterior of the collar and the material is sufficiently compressed by the collar strap to enable the beads 23 to prevent the collar strap from slipping upwardly or downwardly on the collar. The inner and outer bands 20 and 21 are maintained in spaced relation with the outer band in engagement with the beads 23 by expansible spring rings 25 arranged within the hollow collar at the upper and lower edges thereof.

The frame members 18 and 19 are approximately inverted U-shaped and are pivoted together at the top of the frame by a vertical pivot 26 which may consist of a bolt headed at one end and provided at the other end with a nut, or consist of a headed rivet or any other suitable form of pivot. The frame members preferably consist of continuous strips of metal or other suitable material flanged at their side edges for reinforcement and the main frame member 18 is mounted at its ends on horizontal pivots 27 which connect the main frame member 18 and shoulder brackets 28 with the collar 17, as clearly illustrated in Fig. 7 of the drawings. Each horizontal pivot 27 extends through the main frame member 18 and the front band 21 of the collar and is also arranged in a vertical slot 29 of the shoulder bracket 28 and is headed at its ends to prevent displacement. The lower ends of the main frame member 18 are also connected by horizontal transversely disposed pivots 30 with the shoulder brackets to permit pivotal movement thereof limited by the slots 29 the end walls of which are adapted to engage the horizontal pivots 27. The shoulder brackets which rest upon the shoulders of the wearer of the suit are provided at the bottom with pads 31 of any soft cushioning material and they are approximately L-shaped, as shown in Fig. 7 of the drawings, and are provided with side flanges 32 which are pierced by the transverse pivots 30.

The auxiliary frame members which are rotatable on the top vertical pivot 26 to arrange them contiguous to the main frame member for collapsing the hood-supporting frame, are provided at their lower ends with pivots 33 and 34 which extend through and are slidable in upper and lower arcuate slots 35 and 36 of the outer band 21. The sliding of the pivots 33 and 34 in the arcuate slots 35 and 36 permits the auxiliary frame members to be arranged contiguous to the main frame members and also to have their lower ends arranged at points peripherally spaced from the lower ends of the main frame member so that the main and auxiliary frame members will amply support the flexible dome-shaped hood in a distended condition. One end of each auxiliary frame member is provided with a longitudinal slot 37 which receives the upper pivot 33 to permit the necessary play of these ends of the auxiliary frame members when the main and auxiliary frame members are swung downwardly from the upright partially collapsed condition shown in Fig. 11 to the fully collapsed position illustrated in Fig. 12 where the frame members are swung downwardly into contact with the collar 17.

The auxiliary frame members are firmly maintained in the position illustrated in full lines in Fig. 6 with their pivots 33 and 34 in engagement with the outer walls of the arcuate slots 35 and 36 by upper and lower horizontal coil springs 38 and 39 connected at their outer ends with certain of the pivots of the auxiliary frame members and at their inner ends to elongated shanks or rods 40 and 41 of hooks 42 and 43. The lower spring 39 is secured to the lower pivot 34 of one of the auxiliary frame members and the hook which is connected with the lower spring detachably engages the adjacent lower end of the other auxiliary frame member at a point above the lower pivot 34 thereof. The upper coil spring 38 is secured to the upper pivot 33 of one of the auxiliary frame members and the hook 42, which is connected with the upper spring 38, engages the adjacent auxiliary frame member at a point above the upper pivot 33 thereof. The springs are tensioned when the hooks engage the auxiliary frame members so that the pivots 33 and 34 are maintained in contact with the outer walls of the arcuate slots 35 and 36 and the hooks are prevented from becoming accidentally disengaged from the auxiliary frame members. The hooks may be readily disengaged from the auxiliary frame members when it is desired to collapse the supporting frame.

In order to resist vibration of the hood-supporting frame and the spraying device 44 carried by the hood and the supporting frame, the collar is provided at the front and back with depending braces 45 located centrally of the front and rear portions of the collar and extending downwardly therefrom to the front of the breast and at the back to a point between the shoulder blades of the wearer of the suit, and having a slight sigmoidal curvature to inset the lower ends of the braces 45 from the vertical planes of the upper ends and enable the braces to fit snugly against the body of the wearer while the hood-supporting frame is in an upright position. The upper ends of the braces 45 are secured to the collar by horizontal pivots 46 and the lower ends of the braces are provided with a slot or opening 47 through which passes a breast strap which extends around the body of the wearer beneath the arms and is buckled in the front of the wearer by a suitable buckle 49. The braces and the breast strap resist vibration of the hood supporting frame and the spraying device and effectually prevent the same from becoming displaced from the head of the wearer and the braces and securing means, with the shoulder brackets, provide a four-point support for the hood-supporting frame and the spraying device which may be rotated at a high speed without displacing any of the parts. The front and rear braces are adapted, when the hood-supporting frame is collapsed, to be folded into a horizontal position within the collar.

To assist in holding the sealing flap 10 against the collar while closing the suit, the innermost ply or layer of the sealing flap is provided adjacent the right hand side with a coil spring 71 secured at one end to the sealing flap and provided at its other end with a hook 72 which is adapted to be engaged with the main frame member or other suitable portion of the hood-supporting frame, or the interior of the hood. In engaging the hook 72 with the main frame member the spring is tensioned and will thereby assist in holding the sealing flap in position while the suit is being closed and the collar strap buckled around the hood and the collar.

Each foot portion is reinforced at the bottom by inner and outer soles 50 and 51 arranged interiorly and exteriorly of the fabric at the bottom of the foot portion and suitably secured to the same by cement or other fastening means and the outer sole is spaced from the inner sole and the bottom portion of the fabric by transverse strips 52 which are spaced apart to provide ventilating spaces or openings 53. The bottom outer sole 51 is of greater size than the inner sole and the fabric of the foot portion to provide a projecting edge 54 which forms a guard to prevent the foot of the wearer from coming in contact with solid objects which might bruise or otherwise injure the foot.

The transverse strips are secured between the inner and outer soles and also secured between the inner and outer soles are the terminals of flexible straps 55 located at opposite sides of the foot portion above the projecting edge of the outer sole and forming longitudinally disposed flexible loops to receive, as indicated at 56 in Fig. 14 of the drawings, a strap 57 provided with a buckle 58 adjacent one of the loops 55. The strap is passed around the ankle of the wearer to take up the slack of the enlarged leg adjacent the foot portion thereof and is then passed through the other side loop and across the instep of the wearer to the buckle and is secured to the same.

The foot portion is provided at opposite sides of the rear or heel end with bearing brackets 59 consisting of an approximately inverted U-shaped body portion and terminal attaching portions 60 extending outwardly from the lower ends of the end portions of the body of the bearing bracket and disposed longitudinally of the outer sole and secured to the same by headed rivets 61. The bearing bracket is provided with a bearing opening 62 in which is mounted the lower end of a vertical rotary pivot rod 63 which is limited in its rotary movement by a horizontal pin or key 64 which retains the lower end of the pivot rod in the bearing bracket and which is also adapted to engage with the end portions thereof whereby the pivot rod is limited in its rotary movement.

The pivot rods 63 at opposite sides of the rear end of the foot portion have mounted on them feathering blades 65 consisting of a single piece of water and fire resistant sheet material. The wings or blades 65 are reinforced at their upper, lower and outer edges by marginal rods 66 which conform to the configuration of the marginal portions of the blades or wings and which are secured at their terminals to the upper ends of the pivot rods 63. The central portion 67 of the sheet material of the blades or wings extends around the back of the leg portion of the suit and is reinforced at its upper edge by a split band 68, preferably arranged in a casing 69, but the band may be secured to the central portion 67 at the upper edge thereof by any other suitable means. The upper ends of the pivot rods 63 are journaled in suitable bearings 70 located at opposite sides of the band 68.

One end of the band is provided with a catch 73 which is adapted to engage a strap 74 secured at one end to the other end of the band. The catch is composed of an approximately oblong frame 75 and a knurled roller 76 provided with opposite journals 77 arranged in slots 78 in the sides of the oblong frame. The journals are flattened at 79 to a thickness slightly less than the width of the slots so that when the strap 74 is passed around the inner portion of the knurled roller and is pulled to the desired degree of tightness the tension on the strap will cause the flattened portions of the journals to rock slightly in the slots 78 sufficiently to cause an eccentric or camming action of the knurled roller which securely binds the strap against the frame 75 and effectually maintains the strap 74 in the desired adjustment thereof. The band 68 and the strap 74 with the catch encircle the leg of the wearer and securely maintain the upper portion of the feathering blade attachment to the leg of the wearer. When the foot moves forwardly the blades 65 swing rearwardly to the dotted line position illustrated in Fig. 21 of the drawings and after taking a step the blades will be held by the pressure of the water in the full line position shown in Fig. 21 to assist in preventing the foot from slipping backward when walking in water. The blades of the foot portions automatically feather in this manner and do not interfere with the forward movement of the feet.

The elongation of the body of the suit is taken up and the crotch is raised to the proper position between the legs of the wearer by means of a pair of suit straps 80 provided with buckles 81 located at the front of the suit below a buoyancy belt 82. The suit straps extend rearwardly between the legs 5 and then upwardly at the back of the suit in close proximity to each other, and then pass through a loop formed by a short connecting strap 83 which extends over the collar strap and is supported thereby. The suit straps, after passing through the loop of the connecting strap, extend transversely and cross the shoulders at opposite sides of the hood, passing through shoulder loops 84. The suit straps 80 then extend downwardly in the direction of the crotch of the suit and are secured at their free ends to the buckles 81.

The buoyancy belt 82 is provided at the front with pairs of upper and lower buckles 85 and 86 which are connected by short strap sections with the buoyancy belt and which are adapted to engage the free ends of upper and lower pairs of belt straps 87 and 88 secured at one end to the buoyancy belt. The upper straps 87 extend over the shoulders, through the guide loops 84 and cross at the front of the suit and are secured by the buckles 85 to the buoyancy belt which is thereby supported beneath the armpits by the said straps 87. The straps 88 of the lower pair extend between the legs 5 at the crotch and then upwardly and outwardly to the buckles 86 by means of which they are connected with the buoyancy belt at the lower portion of the front thereof. By means of the upper and lower pairs of straps 87 and 88, the buoyancy belt is maintained securely in proper position on the suit.

The buoyancy belt is composed of front and rear sections 89 and 90 approximately semi-cylindrical and detachably secured together at opposite sides of the belt by means of hooks 91 and eyes 92 located at the top and bottom of reinforcing frames 93 and 94. The reinforcing frames, which may be constructed of metal or any other suitable material, consist of upper and lower curved members 95 and end connecting members 96. The reinforcing frames 93 and 94 are preferably arranged in casings 97 of sheets 98 of the fire and water resistant material of which the suit is constructed. The sheets form the inner walls of flexible and collapsible pockets 99, 100 and 101, also made of the said water and fire resistant material. The pockets have inner end walls 102, 103 and 104 and are open at their outer ends so that a person wearing the suit either jumping or falling into water will trap air in the pockets and thereby render the belt buoyant. The pockets 99 open upwardly and the pockets 100 open downwardly and the pockets 101, which are arranged in pairs at the ends of the sections of the buoyancy belt, are arranged horizontally and open outwardly and are adapted to entrap air should a person fall sidewise into the water instead of entering endwise into the same. The pockets also serve to reduce the depth to which a person is submerged by resisting downward movement in the water and thereby enable the buoyancy belt to bring the wearer to the surface in a minimum amount of time.

The outer ends of the pockets are maintained open and distended by means of a curved reinforcing member 105 preferably secured to the pockets by being encased in the material thereof, and having reduced end portions 106 which are pivoted by rivets 107 or other suitable pivots to short posts 108 secured to the reinforcing frames of the sections and receiving and supporting coil springs 109 which are adapted to engage shoulders 110 of the curved marginal members 105 which are reduced at their ends, as clearly shown in Fig. 28 to form the said shoulders 110. While the curved members 105 are shown approximately semi-circular or U-shaped, they may be varied in form to meet variations in the form of the pockets, as will be readily understood. The pockets are adapted to be collapsed by compressing the springs and swinging the marginal pocket distending members inwardly in close proximity to the frames of the sections of the buoyancy belt, as illustrated in Figs. 25 and 28 of the drawings. The pockets are provided at the outer portions of their open ends with hooks 111 through which is laced a cord 112 having a slip-knot 113 and an extended end 114 which is adapted to be pulled to untie the cord and release the collapsed pockets, which will be automatically opened by the coil springs 109 which will expand from the position shown in Fig. 28 to that illustrated in Fig. 26 and will engage both of the shoulders 110 and maintain the pockets in operative position.

A container 139 containing a chemical fire extinguishing material is mounted on the front of the suit and is provided with a valve 140. The chemical is in the container under pressure and when released by the valve will pass through the supply pipe 141 to the spraying device 44 mounted on top of the hood.

The hood 16 is also provided with a valve controlled inlet 145 adapted to communicate with an oxygen tank (not shown) or with the atmosphere for supplying oxygen or air to the interior of the hood.

When the suit is employed for fire fighting the buoyancy belt may, of course, be removed, but the complete fire and water safety suit may be used by aviators, especially on missions where all of the features of the suit may be necessary.

I claim:

1. A safety suit of the class described, comprising a body having shoulder portions, legs, arms and a hood and having at the front a transverse slit and a longitudinal slit, the transverse slit extending from a point within the lower portion of the hood downwardly across the front of the body at a slight inclination to a point slightly below one of the shoulder portions and the longitudinal slit extending from the upper end of the transverse slit downwardly to approximately the juncture of the body and the legs, the slits forming a partially severed front portion of the body comprising a sealing flap, a wide panel attached to the body adjacent the longitudinal slit and to the partially severed front portion adjacent the free end thereof, the wide panel forming a fullness being foldable inwardly along longitudinal lines and located interiorly of the body and comprising a plurality of layers extending into the lower portion of the hood above the bottom thereof, and fastening means connecting the body with the partially severed front portion.

2. A safety suit of the class described, comprising a body having shoulder portions and a collar portion above the shoulder portions, legs, and arms and having at the front a transverse slit and a longitudinal slit, the transverse slit extending from a point above one shoulder portion across the front of the body at a slight inclination to a point slightly below the other shoulder portion and the longitudinal slit extending from the upper end of the transverse slit downwardly to approximately the juncture of the body and the legs; the slits forming a partially severed front portion of the body comprising a sealing flap, a wide panel attached to the body adjacent the longitudinal slit and to the partially severed front portion adjacent the free end thereof, the wide panel forming a fullness being foldable inwardly along longitudinal lines and located interiorly of the body and comprising a plurality of layers extending into the lower portion of the hood above the bottom thereof, and fastening means connecting the body with the partially severed front portion, a collapsible supporting frame arranged interiorly of and connected to the suit and comprising a rigid collar located interiorly of the suit at the collar portion of the body and inverted substantially U-shaped frame members connected together at the top of the frame and secured at the lower ends of their sides to the collar and at peripherally spaced points around the same, and an exteriorly arranged collar strap encircling the suit at the collar and clamping the suit and the sealing flap against the said collar.

3. A safety suit of the class described including a body having a collar portion, and a collapsible supporting frame arranged within and connected to the suit and comprising a rigid collar located at the collar portion of the body and inverted substantially U-shaped main and auxiliary frame members pivoted together at the top for rotary movement on a vertical axis and having the lower ends of their sides located at peripherally spaced points on said collar, said auxiliary members being slidable on the collar for arranging them contiguous to the main frame member and at points spaced therefrom, the lower ends of the frame members being pivotally connected to the collar for movement on horizontal axes whereby the frame members are foldable against the collar for collapsing the supporting frame.

4. A safety suit of the class described including a body having a collar portion, and a collapsible supporting frame connected to the body and comprising a rigid collar located at the collar portion of the body and inverted substantially U-shaped main and auxiliary frame members pivotally connected together at the top of the frame for movement of the auxiliary frame members on a vertical axis, said frame members being pivoted at the lower ends of their sides to the collar for movement on a horizontal axis and said collar being provided with arcuate slots receiving the pivots of the auxiliary frame members to permit sliding movement of the same on the collar to carry them to and from the lower ends of the main frame member, the main and auxiliary frame members being foldable against the collar to collapse the frame.

5. A safety suit of the class described including a body having a collar portion and shoulder portions, and a collapsible supporting frame arranged within the body connected thereto and comprising a rigid collar located at the collar portion of the body and inverted substantially U-shaped main and auxiliary frame members pivoted together at the top for rotary movement on a vertical axis and having the lower ends of their sides located at peripherally spaced points on said collar, said auxiliary members being slidable on the collar for arranging them contiguous to the main frame member and at points spaced therefrom, the lower ends of the frame members being pivotally connected to the collar for movement on horizontal axes whereby the frame members are foldable against the collar for collapsing the supporting frame, and shoulder brackets located within the shoulder portions of the body at opposite sides of the collar and pivotally connected with the same and supporting said frame upon the shoulders of the wearer.

6. A safety suit of the class described including a body having a collar portion, a collapsible supporting frame extending upwardly from the interior of the collar portion of the body when in operative position and comprising a rigid collar located within the collar portion of the body and inverted substantially U-shaped frame members pivotally and slidably connected at their lower ends to the collar and adjustable to a position substantially contiguous to each other for simultaneous collapsing, an upright brace depending from the collar at the back thereof and connected at its upper end to the same, and a breast strap connected to the lower end of the brace and adapted to encircle the body of the wearer of the suit.

7. A safety suit of the class described comprising a body having shoulder portions and a collar portion above the shoulder portions, legs and arms and having at the front a transverse slit and a longitudinal slit, the transverse slit extending from a point above one shoulder portion across the front of the body at a slight inclination to a point slightly below the other shoulder portion and the longitudinal slit extending from the upper end of the transverse slit downwardly to approximately the juncture of the body and the legs, the body portion between the slits providing an opening, a closure flap for closing the opening, a panel between the body and the free end of the flap being foldable along longitudinal lines inwardly of the body and forming a sealing flap, a rigid collar located interiorly of the safety suit, means attached to the upper portion of the sealing flap connectable to the collar for supporting the sealing flap at the upper portion thereof, fastening means connecting the slit portions of the suit, and a collar strap encircling the safety suit and clamping the sealing flap and closure flap against said collar in sealing position.

8. A safety suit of the class described comprising a body having shoulder portions and a neck covering portion, legs and arms and having at the front a transverse slit and a longitudinal slit, the transverse slit extending from a point at the upper portion of the neck covering portion across the front of the body at a slight inclination to a point slightly below one of the shoulder portions and the longitudinal slit extending from the upper end of the transverse slit downwardly to approximately the juncture of the body and the legs, the body portion between the slits providing an opening, a closure flap for closing the opening, a panel within the opening secured to the body adjacent the longitudinal slit and to the free end of the closure flap, the panel being foldable along longitudinal lines inwardly of the body and forming a sealing flap, and fastening means connecting the closure flap to the body at the slits therein.

9. A safety suit including a flexible body having a neck portion extending upwardly therefrom and a collapsible frame connected to the body comprising a rigid collar within the neck portion of the body, main and auxiliary frame members each pivotally connected to the collar at spaced substantially diametrically opposite points, means for slidably connecting the auxiliary frame members to the collar for sliding the auxiliary frame members around the collar to position the auxiliary and main frame members contiguous to permit said frame members to fold simultaneously downwardly into substantially the plane of the collar.

10. A safety suit including a flexible body having a neck portion extending upwardly therefrom and a collapsible frame connected to the body comprising a rigid collar within the neck portion of the body, a plurality of spanning frame members each pivotally connected to the collar at spaced substantially diametrically opposite points, means for slidably connecting at least one of the frame members to the collar for sliding that frame member around the collar to position the frame members contiguous to permit the frame members to fold simultaneously downwardly into substantially the plane of the collar.

(References on following page)

References Cited in the file of this patent

UNITED STATES PATENTS

| | | |
|---|---|---|
| 1,127,174 | Brazil | Feb. 2, 1915 |
| 1,185,158 | Yovich | May 30, 1916 |
| 1,204,921 | Willis | Nov. 14, 1916 |
| 1,243,415 | Jaynes | Oct. 16, 1917 |
| 1,375,803 | Souliotis | Apr. 26, 1921 |
| 1,466,726 | Meeks | Sept. 4, 1923 |
| 1,535,207 | Dorff | Apr. 28, 1925 |
| 1,595,908 | Miller | Aug. 10, 1926 |
| 1,853,460 | Rzeminiecki | Apr. 12, 1932 |
| 2,280,668 | Sherlock | Apr. 21, 1942 |
| 2,291,861 | Astrove | Aug. 4, 1942 |
| 2,372,501 | Lawrence | Mar. 27, 1945 |
| 2,379,963 | Holding | July 10, 1945 |
| 2,383,261 | Kronhaus | Aug. 21, 1945 |